Feb. 28, 1939.  J. W. WHITE ET AL  2,149,079
TIRE BEAD CONSTRUCTION
Filed March 12, 1938
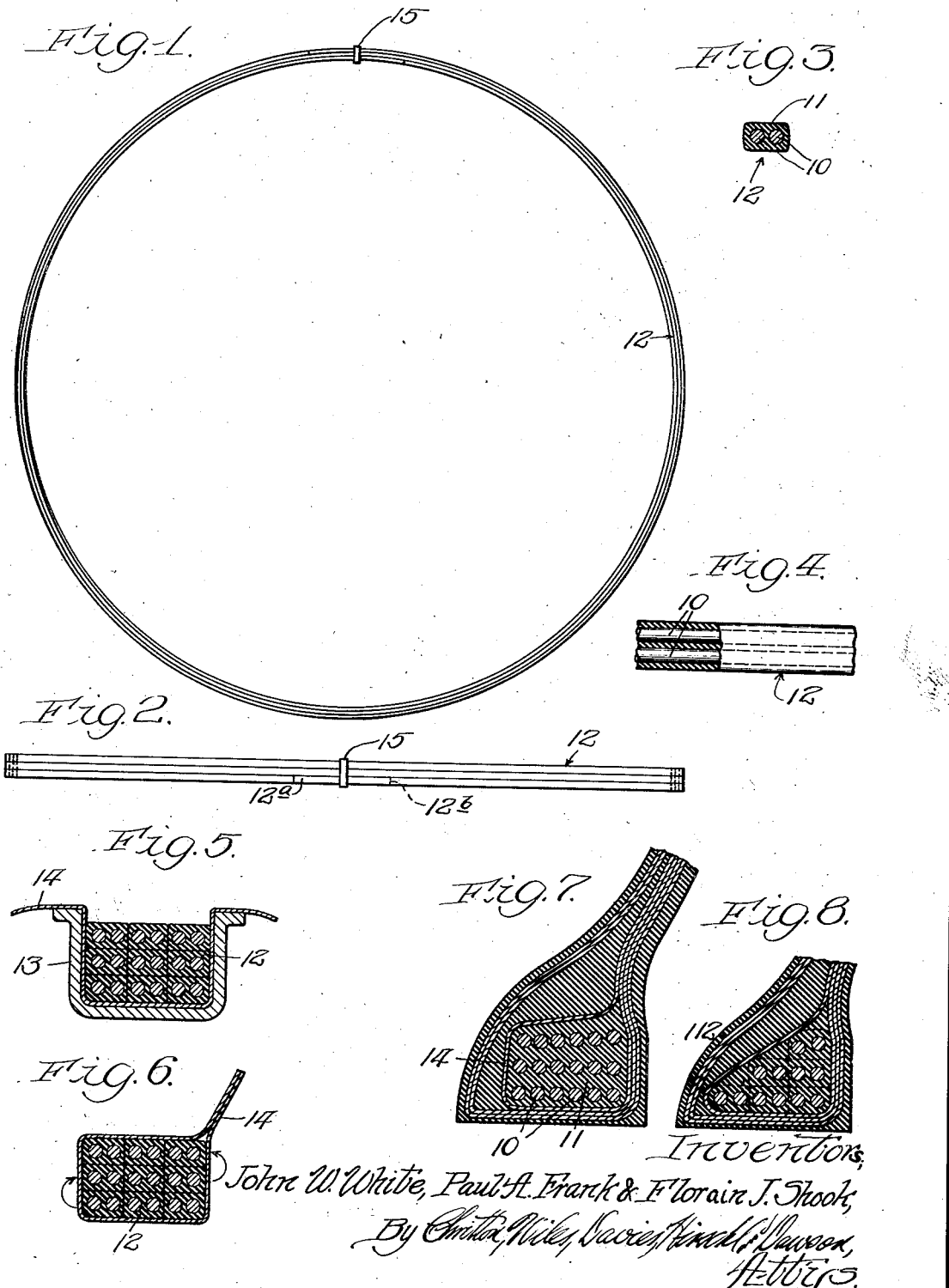
Inventors:
John W. White, Paul A. Frank & Florain J. Shook Patented Feb. 28, 1939

2,149,079

UNITED STATES PATENT OFFICE 2,149,079

TIRE BEAD CONSTRUCTION

John W. White, Wadsworth, and Paul A. Frank and Florain J. Shook, Akron, Ohio, assignors to National Standard Company, Niles, Mich., a corporation of Michigan Application March 12, 1938, Serial No. 195,624

6 Claims. (Cl. 245—1.5)

This invention relates to improvements in tire bead construction and more especially beads for use in pneumatic tires.

The invention is directed more particularly to the design and construction of the reinforcement used in the tire bead to impart inextensibility to the same.

It has been customary to use wire as a reinforcing element in tire beads, the wire ordinairly being coated with rubber or rubber compound. Heretofore, a single wire was wound in a bead forming ring to make an annulus later incorporated in the tire bead; or else a flat tape containing a plurality of parallel wires was wound in the bead forming ring to make an annulus of several layers of the tape, said annulus being then incorporated in the bead. Heretofore, however, whenever a tape was employed it always had more than two wires in it and had a width substantially the same as the width of the bead forming ring so that there was only one convolution of the tape in each layer of the annulus.

The use of a single wire had the advantage of giving more uniformity to the weight of the annulus because the annulus had only two cut ends of wire and these could be spaced from each other by overlapping the ends. The disadvantage of using a single wire was that it was difficult in winding the wire on the bead forming ring and also in the later stages of manufacture of the tire, in keeping the several convolutions of wire lying in ordered convolutions and layers. It has been found desirable to have the wire or wires lying in regular layers with each layer containing several convolutions of wire. It has also been found desirable to have the corresponding convolutions in the respective layers substantially one above the other. In using a single wire it was difficult to accomplish any regular formation of this kind owing to the fact that the cross-section of a single-coated wire was circular so that in winding the several convolutions and several layers, the convolutions in each layer would not lie side by side but would build up more or less unevenly, thus destroying any regular formation of layers. Also, even if this irregularity did not occur while placing the wire on the bead forming ring, it was likely to happen during the curing of the bead and the other steps of manufacture.

The use of a tape substantially the same width as the bead forming ring with a plurality of wires in it had the advantage of permitting the winding of the wires in regular formation. That is, each layer had parallel convolutions of wire side by side and the corresponding convolutions in the respective layers were substantially one above the other. This was permitted because of the use of the flat tape with parallel wires in it. The use of this older wide tape, however, had the disadvantage of destroying the uniformity of weight and balance of the annulus. This was due to the fact that upon cutting the tape, several wires (always more than two) were cut at once. For example, if the tape had six wires lying side by side, it will be seen that where the tape was cut there would be six ends of wire; thus causing considerable unbalance at this point.

By the use of the invention there are obtained substantially the benefits of both a single wire and a tape without suffering the disadvantages to the extent as pointed out above.

In the practice of the invention there is employed a tape having only two wires in it. This tape is flat and is of such a width that a predetermined number of convolutions will be substantially the width of the bead forming ring. Therefore, a predetermined number of parallel convolutions can be wound on the bead forming ring in each layer and the corresponding convolutions in the respective layers will lie substantially one above the other. At the ends, where the tape is cut, there will be only two ends of wire cut, resulting in very slight unbalance at that point.

Other features and advantages will appear more fully in the subsequent portion of the specification.

In that form of device embodying the features of the invention shown in the accompanying drawing—

Fig. 1 is a view in side elevation of the tire bead reinforcing annulus with the flipper strip removed; Fig. 2 is a top plan view of the same; Fig. 3 is a sectional view of the tape used in forming the bead; Fig. 4 is a top plan view of a portion of the tape with a part of the rubber covering removed; Fig. 5 is a vertical sectional view showing the tape wound in the bead forming ring; Fig. 6 is a similar view showing a flipper strip drawn about the tape; Fig. 7 is a vertical sectional view of the completed bead; and Fig. 8 is a view like Fig. 7 showing a modified form.

As shown in the drawing, two wires 10, 10 are formed into a tape 12 by coating the same with rubber or rubber compound 11. The resulting tape is flat and substantially rectangular in cross-section.

13 indicates a bead forming ring in which the tape 12 is wound to form the reinforcing annulus that is later incorporated into the bead of the tire. The bead forming ring preferably is first lined with a flipper strip 14 before winding the tape therein. As shown in Figs. 5 and 6, the tape is substantially one-third as wide as the bottom of the bead forming ring 13 so that just three convolutions of tape will form one layer. As many layers as desired may be built into the annulus. For example, there are here shown three layers. That is, there are three convolutions of tape per layer and three layers. Corresponding convolutions in the respective layers are substantially one above the other and this applies necessarily also to the individual wires. This regular and ordered arrangement and formation is permitted because of the use of a flat tape. Since the cross-section of the tape is substantially rectangular, the convolutions will lie flat and side by side, thus enabling the formation of regular convolutions and layers as specified above.

After the requisite number of convolutions of tape has been wound into the bead forming ring the flipper strip 14 is preferably wound around the convolutions as shown in Fig. 6 and suitably cemented or otherwise fastened in a manner well known in the art to assist in holding the various convolutions in the form of an annulus.

In Figs. 1 and 2 the annulus is shown with the flipper strip removed. It will be seen that the ends of the tape as indicated by 12a and 12b are separated somewhat so as to distribute any unevenness and weight caused by the cut ends. In winding the tape in the bead forming ring the three convolutions forming the inner layer are wound across the ring side by side and the first convolution of the next layer is then started on top of the last convolution in the under layer as shown by the arrows in Fig. 6.

15 may indicate a suitable clip or fastener to assist in holding the ends of the tape in the annulus.

The annulus herein described is sometimes described as a grommet. The completed annulus or grommet usually covered with a flipper strip 14 or other fabric wrapper is incorporated in the tire bead in a manner well known in the art. In the process of incorporating the annulus in the bead, the bead is frequently referred to as a green bead and is often completely cured with the tire casing. In some cases it has been found preferable to give the bead a preliminary or partial vulcanization before incorporating it in the tire. It is to be understood that my invention may be used in any kind of bead or tire manufacture employing an annulus or grommet or a reinforcement as illustrated.

In Figs. 5, 6 and 7 each layer is shown with the same number of convolutions. If desired, the outer layers may have fewer convolutions. For example, as shown in Fig. 8, the inner layer of the tape 112 may include three convolutions, the next outer layer two convolutions, and the next, one.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

We claim:

1. A tire bead reinforcement comprising a flat tape including a plurality of wires, said tape being wound into an annulus having a plurality of layers, an inner layer including a plurality of convolutions.

2. A tire bead reinforcement comprising a flat tape including a plurality of wires, said tape being wound into an annulus having a plurality of layers, an inner layer including a plurality of convolutions, corresponding convolutions in the respective layers being substantially one above the other.

3. A tire bead reinforcement as claimed in claim 1 in which the tape includes two wires.

4. A tire bead reinforcement as claimed in claim 2 in which the tape includes two wires.

5. A tire bead reinforcement as claimed in claim 1 in which the tape is substantially rectangular in cross-section.

6. A tire bead reinforcement as claimed in claim 2 in which the tape is substantially rectangular in cross-section.

JOHN W. WHITE.
PAUL A. FRANK.
FLORAIN J. SHOOK.